(12) United States Patent
Maeda et al.

(10) Patent No.: US 12,479,033 B2
(45) Date of Patent: Nov. 25, 2025

(54) TOOL HOLDER AND MACHINING METHOD

(71) Applicant: MAKINO MILLING MACHINE CO., LTD., Tokyo (JP)

(72) Inventors: Junichi Maeda, Kanagawa (JP); Takaaki Sugasaki, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 710 days.

(21) Appl. No.: 17/631,164

(22) PCT Filed: Jul. 22, 2020

(86) PCT No.: PCT/JP2020/028560
§ 371 (c)(1),
(2) Date: Jan. 28, 2022

(87) PCT Pub. No.: WO2021/020303
PCT Pub. Date: Feb. 4, 2021

(65) Prior Publication Data
US 2022/0266350 A1 Aug. 25, 2022

(30) Foreign Application Priority Data
Jul. 30, 2019 (JP) ................. 2019-140058

(51) Int. Cl.
*B23B 29/034* (2006.01)
*B23Q 17/22* (2006.01)
(52) U.S. Cl.
CPC ........ *B23B 29/03471* (2013.01); *B23Q 17/22* (2013.01)

(58) Field of Classification Search
CPC ........ B23B 29/03471; B23B 29/03467; B23B 29/03475; B23B 29/03432;
(Continued)

(56) References Cited

U.S. PATENT DOCUMENTS 3,710,659 A * 1/1973 Pagella ............. B23B 29/03435
82/131
4,411,177 A * 10/1983 Batistoni ........... B23B 29/03471
82/131
(Continued)

FOREIGN PATENT DOCUMENTS

CN 107457416 A * 12/2017 ....... B23B 29/03467
DE 1043751 B 11/1958
(Continued)

*Primary Examiner* — Ryan Rufo
(74) *Attorney, Agent, or Firm* — Merchant & Gould P.C.

(57) ABSTRACT

A tool holder (100) comprising: an outside section (10) connected and fixed to a main shaft housing; a rotation input section (20) that is gripped by the main shaft and caused to rotate at a first rotation speed r1; a rotation output section (40) that has the rotational force from the rotation input section (20) transmitted thereto and rotates at a second rotation speed r2 that is different from the first rotation speed r1; a slider (60) that is moved in a first direction that intersects the rotational axis (Os) of the main shaft, as a result of the force from the rotation output section (40); a cutting edge (70) that is moved in the first direction by the slider (60) and is rotated by the rotation input section (20); and a detection mechanism (90) for detecting that the cutting edge (70) is at the origin position.

3 Claims, 8 Drawing Sheets

(58) Field of Classification Search
CPC ........ B23B 29/03439; B23B 29/03435; B23B 29/03442; B23B 29/034; B23B 29/03414; B23Q 17/22; B23Q 17/2216; B23Q 17/2225

See application file for complete search history.

(56) References Cited

U.S. PATENT DOCUMENTS

| | | | | |
|---|---|---|---|---|
| 4,489,629 | A | * 12/1984 | D'Andrea | ......... B23B 29/03439 |
| | | | | 483/32 |
| 4,637,285 | A | * 1/1987 | Mizoguchi | ........ B23B 29/03439 |
| | | | | 82/131 |
| 6,367,359 | B1 | 4/2002 | Ropos | |
| 2003/0002938 | A1 | 1/2003 | Maar | |

FOREIGN PATENT DOCUMENTS

| | | | |
|---|---|---|---|
| EP | 0060453 | A2 * | 9/1982 |
| EP | 0207209 | A1 | 1/1987 |
| EP | 2322319 | A2 | 5/2011 |
| JP | 59037027 | A * | 2/1984 |
| JP | H02-0274406 | A | 11/1990 |
| JP | H06-091484 | A | 4/1994 |
| JP | 2003-512188 | A | 4/2003 |
| JP | 2010082755 | A * | 4/2010 |

* cited by examiner (a)

(b)

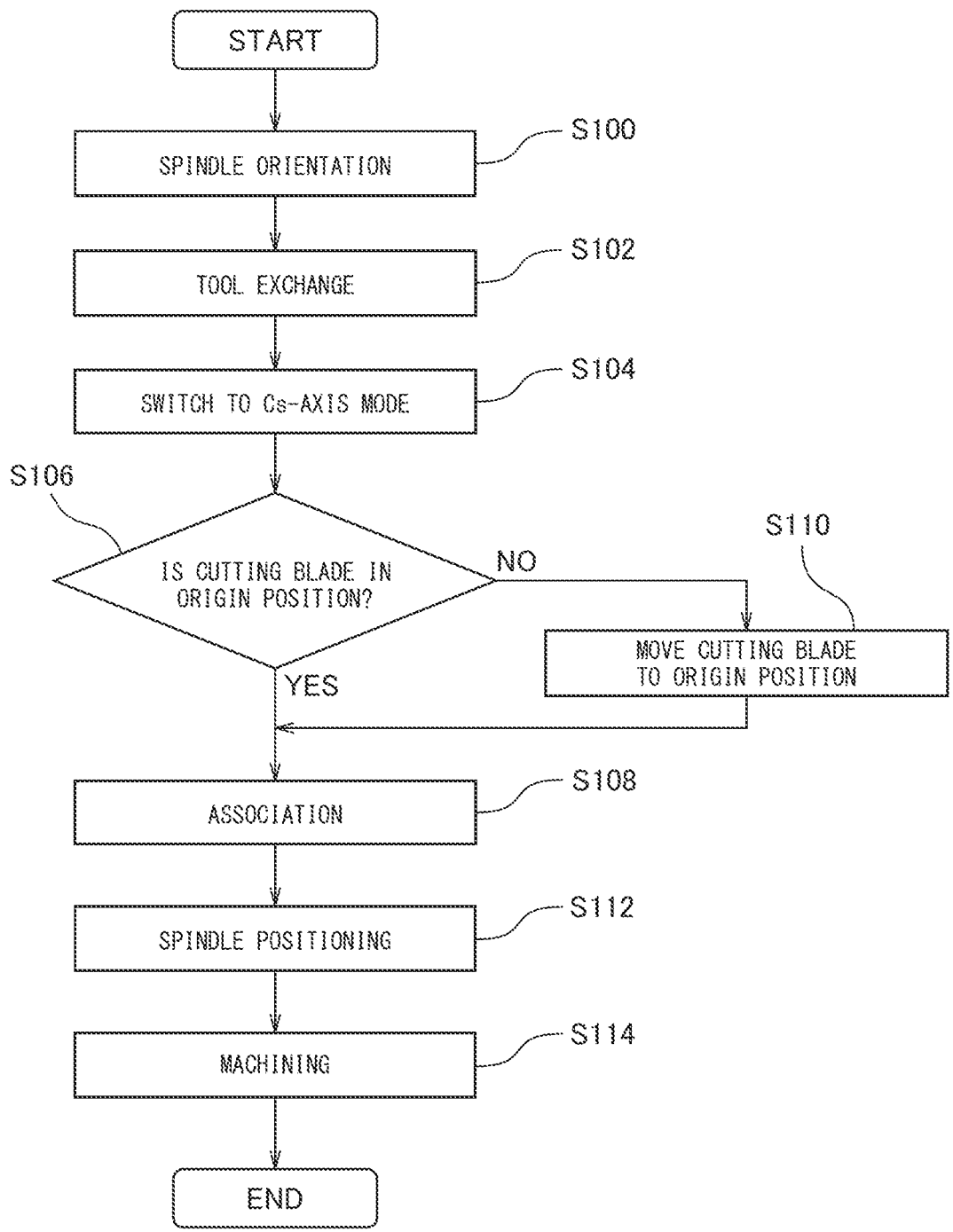

TOOL HOLDER AND MACHINING METHOD

This application is a National Stage Application of PCT/JP2020/028560 filed Jul. 22, 2020, which claims benefit of priority to Japanese Patent Application No. 2019-140058, filed Jul. 30, 2019, which applications are incorporated herein by reference. To the extent appropriate, a claim of priority is made to each of the above disclosed applications.

FIELD

The present disclosure relates to a tool holder and a machining method.

BACKGROUND

Conventionally, methods for machining a workpiece while a cutting edge is rotated and the cutting edge moves radially with respect to a rotational axis are known. For example, Patent Literature 1 discloses a U-center tool which is used in such machining. This U-center tool is used in a machining center comprising a spindle and a separate additional axis (U-axis). The cutting edge is rotated by the spindle of the machining center and is fed in the U-axis direction orthogonal to the spindle axis by a drive shaft of the U-axis described above. By such an operation, machining such as facing and boring is performed.

Furthermore. Patent Literature 2 discloses a facing unit used in machining as described above. This facing unit is used in a machine tool comprising a rack shaft which can be moved along the rotational axis inside a hollow spindle. The axial movement of the rack shaft is converted into a radial movement by a pinion. A cutting edge is rotated by the spindle of the machine tool and moved radially by the rack shaft and pinion described above. By such an operation, machining such as boring and planar cutting is performed.

CITATION LIST

Patent Literature

[PTL 1] Japanese Unexamined Patent Publication (Kokai) No. 6-91484
[PTL 2] Japanese Unexamined Patent Publication (Kokai) No. 2-274406

SUMMARY

Technical Problem

In tool holders as described in Patent Literature 1 and 2, the radial direction position of the cutting edge cannot be detected. Thus, for example, in order to prevent excessive cutting due to excessive movement of the cutting edge, for example, it is necessary that a limit be provided. Thus, only the diameter specified by the limit can be machined, and when a plurality of different diameters are to be machined, for example, it is necessary to prepare a plurality of tool holders. In this case, it takes time to exchange the tool holders.

In consideration of the problems described above, the present disclosure aims to provide a tool holder and machining method with which facing can be performed in a short time.

Solution to Problem

One aspect of the present disclosure provides a tool holder which is used in a machine tool comprising a spindle for rotating a tool, the tool holder comprising an outside portion which is connected and affixed to a housing of the spindle, a rotation input part which is gripped by the spindle and which is rotated at a first rotation speed, a rotation output part to which rotational power is transmitted from the rotation input part and which is rotated at a second rotation speed different from the first rotation speed, a slider which is moved in a first direction orthogonal to the rotational axis of the spindle by power from the rotation output part, a cutting edge which is moved in the first direction by the slider and which is rotated by the rotation input part, and a detection mechanism for detecting that the cutting edge is in an origin position.

The tool holder of the present aspect comprises a slider which moves the cutting tool in the first direction by power from the rotation output part (i.e., rotational power from the spindle). In such a tool holder, the rotational angle amount of the spindle and the movement amount of the cutting edge in the first direction can be associated in advance. The inventors of the present invention have discovered that by using such a tool holder together with a machine tool comprising a spindle the rotation angle position of which can be controlled (which may also be referred to as "Cs-axis" in the present disclosure), facing can be performed in a short time. Specifically, by measuring the position of the cutting edge in the first direction after installation of the tool holder in the spindle, the rotation angle position of the spindle can be associated with the position of the cutting edge in the first direction. Since the tool holder of the present aspect comprises a detection mechanism which is capable of detecting that the cutting edge is in the origin position, when the cutting edge is in the origin position, the rotation angle position at that time can be set as the origin of the spindle. Thus, the machine tool can calculate the amount of movement of the cutting edge from the origin in the first direction during machining based on the relationship between the rotation angle amount of the spindle and the amount of movement of the cutting edge in the first direction, which are associated in advance. Therefore, excessive cutting can be prevented without a limiter, and a plurality of diameters can be machined with one tool holder without exchanging the tool holder. Thus, facing can be performed in a short time.

The detection mechanism may have a channel through which fluid can pass, and the channel may be configured so as to be closed when the cutting edge is in the origin position and open when the cutting edge is not in the origin position, or alternatively, may be configured so as to be open when the cutting edge is in the origin position and closed when the cutting edge is not in the origin position. In these cases, fluid passes through the channel and the pressure of the fluid in the channel is detected by a sensor, whereby it can be detected whether or not the cutting edge is in the origin position based on the opening and closing of the channel (because when the channel is closed, the pressure of the fluid in the channel rises). Thus, since detection can be performed using the fluid (for example, compressed air), the risk of damage to the constituent elements of the tool holder can be reduced.

Another aspect of the present disclosure provides a workpiece machining method in which a machine tool comprising a spindle for rotating a tool is used, wherein the machine tool comprises a spindle the rotation angle position of which can be controlled, the workpiece machining method comprising the steps of installing a tool holder in the spindle of the machine tool, the tool holder comprising an outside portion which is connected and affixed to a housing of the spindle, a rotation input part which is gripped by the spindle and rotated at a first rotation speed, a rotation output part to which rotational power is transmitted from the rotation input part and which is rotated at a second rotation speed different from the first rotation speed, a slider which is moved in a first direction orthogonal to the rotational axis of the spindle by power from the rotation output part, and a cutting edge which is moved in the first direction by the slider and which is rotated by the rotation input part, measuring a position of the cutting edge in the first direction after installation of the tool holder in the spindle, and machining a workpiece while the cutting edge is rotated by the machine tool and the cutting edge is moved in the first direction.

The tool holder used in this method comprises a slider which moves the cutting edge in the first direction by power from the rotation output part (i.e., rotational power from the spindle). By using a tool holder such as the above along with a machine tool having a Cs-axis, the rotation angle position of the spindle can be associated with the position of the cutting edge in the first direction in advance. This is enabled by the step of measuring the position of the cutting edge after installation of the tool holder in the spindle. Thus, in this method, the position of the cutting edge in the first direction during machining can be calculated based on the relationship between the rotation angle amount of the spindle and the movement amount of the cutting edge in the first direction, which are associated in advance. Therefore, excessive cutting can be prevented without a limiter, and a plurality of diameters can be machined with one tool holder without exchanging the tool holder. Thus, facing can be performed in a short time.

The tool holder may further comprise a detection mechanism for detecting that the cutting edge is in an origin position, and the step of measuring the position of the cutting edge in the first direction may include the detection mechanism detecting that the cutting edge is in the origin position. In this case, it is possible to measure that the cutting edge is in the origin position, and the rotation angle position at that time can be set as the origin of the spindle. Thus, in this case, during machining, the movement amount of the cutting edge from the origin in the first direction can be calculated.

Advantageous Effects of Invention

According to one aspect of the present disclosure, there can be provided a tool holder and machining method with which facing can be performed in a short time.

BRIEF DESCRIPTION OF DRAWINGS

FIG. 8 is a flowchart showing the operations of a machine tool.

DESCRIPTION OF EMBODIMENTS

The tool holder and machining method according to an embodiment will be described below with reference to the attached drawings. Identical or corresponding elements have been assigned the same reference sign, and duplicate descriptions thereof have been omitted. In order to facilitate understanding, the scales of the drawings have been changed in some cases.

Figure 1:
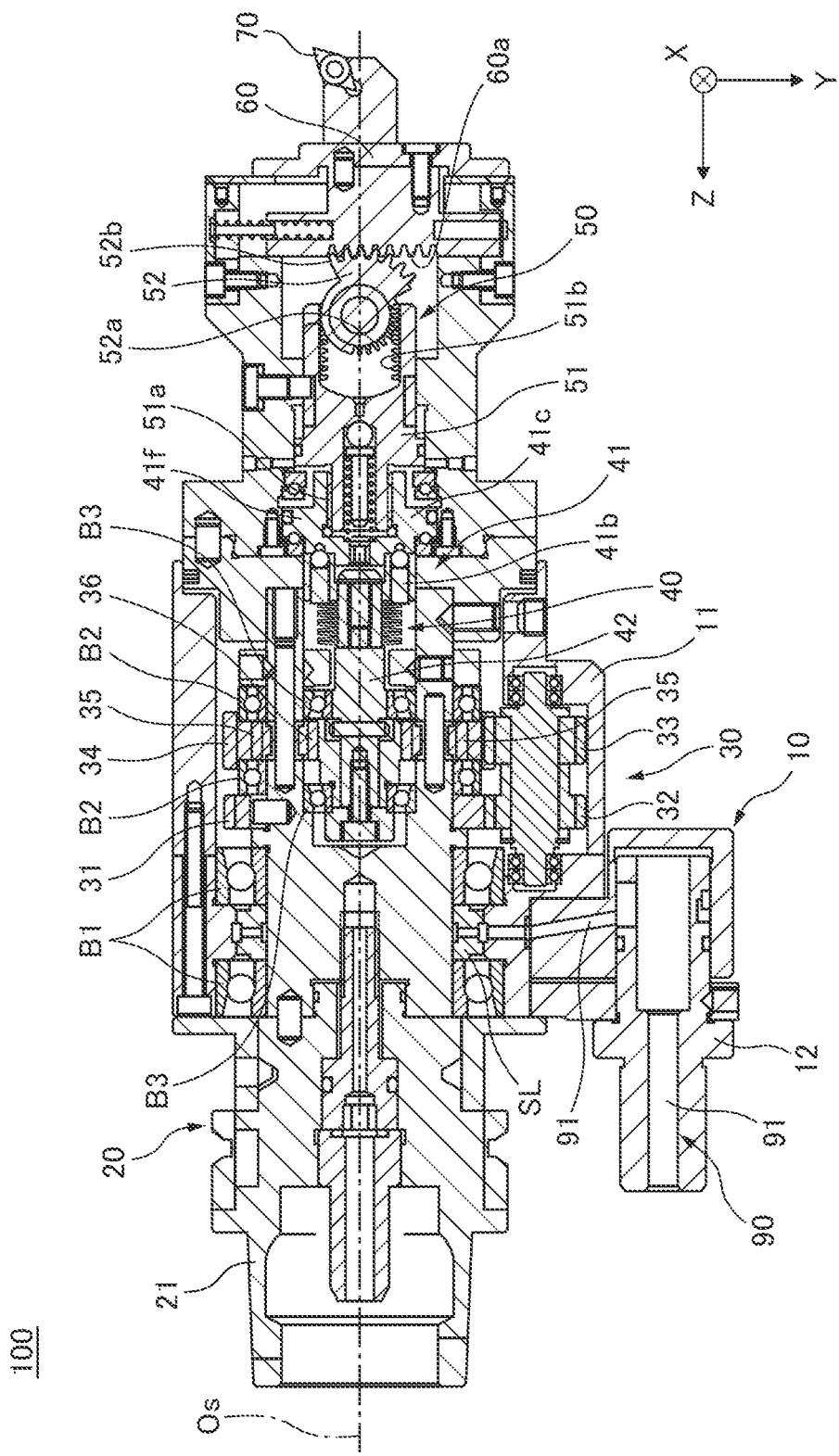
FIG. 1 is a schematic cross-sectional view showing a tool holder according to an embodiment taken along the rotational axis.
Figure 7:
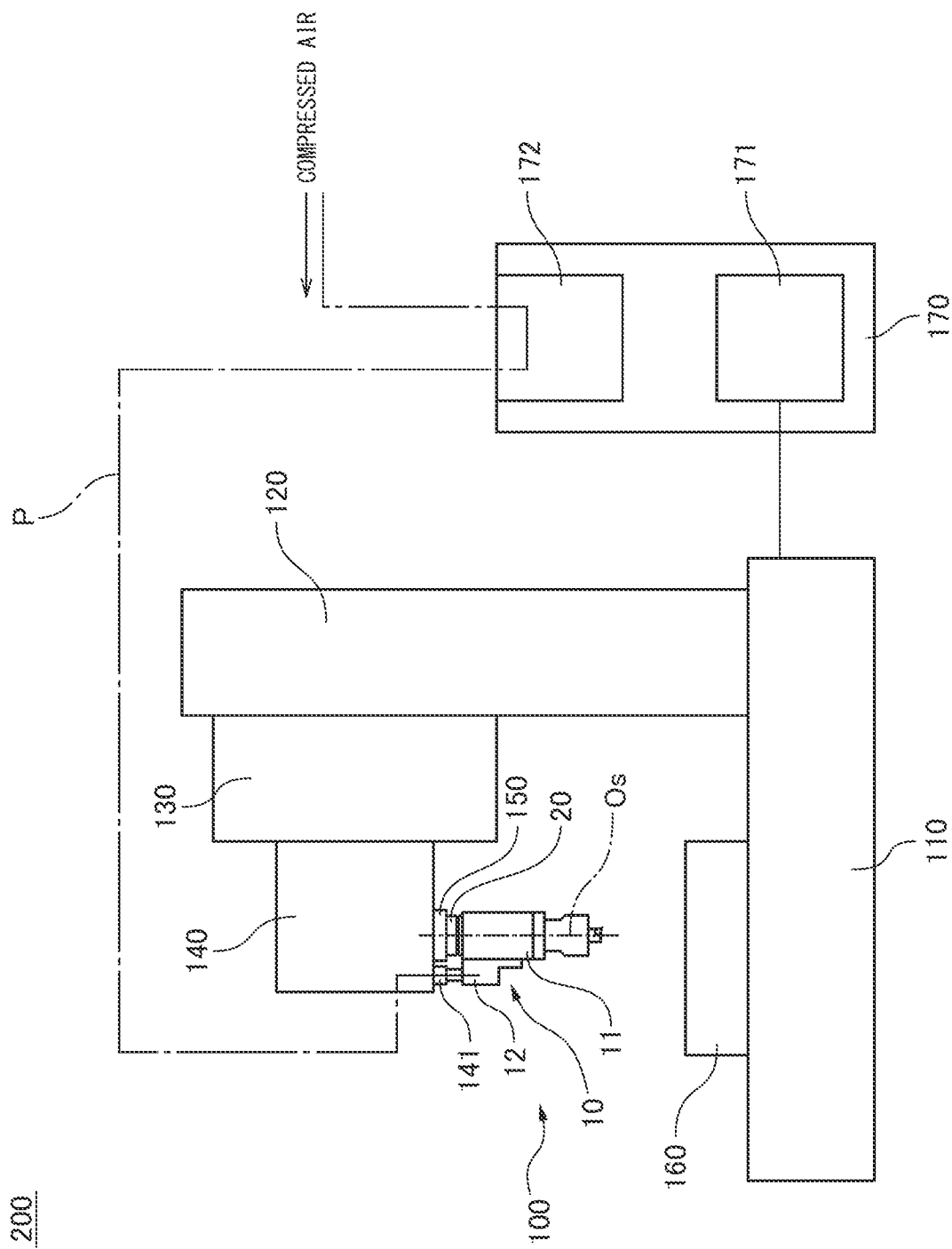
FIG. 7 is a schematic side view showing a machine tool in which the tool holder of FIG. 1 is installed.

FIG. 1 is a schematic cross-sectional view showing a tool holder 100 according to an embodiment taken along the rotational axis Os, and FIG. 7 is a schematic side view showing a machine tool 200 in which the tool holder 100 of FIG. 1 is installed. With reference to FIG. 7, the machine tool 200 can be, for example, a vertical machining center. The machine tool 200 may be a different machine. The machine tool 200 comprises, for example, a bed 110, a column 120, a saddle 130, a spindle head 140, a spindle 150, a table 160, and a controller 170. The machine tool 200 may further comprise other constituent elements.

In the present embodiment, the spindle 150 rotates about the vertical axis Os. In the machine tool 200, the direction along the axis Os is the Z-axis direction (which may also be referred to as the up-down direction). Furthermore, in the machine tool 200, among horizontal directions, the direction in which the column 120 and the table 160 face each other is the Y-axis direction (which may also be referred to as a front-rear direction). The side where the table 160 is located with respect to the column 120 is the front side, and the side opposite thereto is the rear side. Further, in the machine tool 200, among horizontal directions, the direction perpendicular to the Y-axis direction is the X-axis direction (which may also be referred to as the left-right direction).

The bed 110 is arranged on a foundation such as the floor of a factory. The column 120 extends vertically from the rear part of the bed 110. The saddle 130 is movably provided on the front surface of the column 120. The saddle 130 can move in, for example, the X-axis direction. The spindle head 140 is movably provided on the front surface of the saddle 130. The spindle head 140 can move in, for example, the Z-axis direction. The spindle head 140 rotatably supports the spindle 150 and corresponds to a housing for the spindle 150. The spindle 150 grips the tool holder 100. The spindle 150 is rotated by, for example, a motor (not illustrated). The table 160 is movably provided on a front part of the bed 110. The table 160 is movable in, for example, the Y-axis direction. The feed device (not illustrated) of each of the saddle 130, the spindle head 140, and table 160 may have, for example, a linear motion rolling guide, a ball screw mechanism, a motor, etc. The feeding of the saddle 130, the spindle head 140, and the table 160, and the rotation of the spindle 150 can be controlled by the controller 170 (for example, an NC device 171).

In the present embodiment, the machine tool 200 can control the rotation angle position of the spindle 150 (which may also be referred to as a Cs-axis). Specifically, in the present embodiment, the spindle 150 can be controlled by both a speed control mode and a position control mode (which may also be referred to as Cs-axis mode). In the speed control mode, the spindle 150 is controlled based on speed (rotation speed), and in this case, the rotation angle position of the spindle 150 is not controlled. Conversely, in Cs-axis mode, the spindle 150 is controlled based on rotation speed as well as the rotational angle amount from the origin, and thus, the rotation angle position of the spindle 150 can be controlled. The origin of the rotation angle can be set to, for example, an predetermined position determined with respect to the position of the spindle head 140. Further, the origin can be changed to an arbitrary position deviated from this predetermined position. In the present disclosure, the rotation speed of the spindle 150 may also be referred to as the first rotation speed r1.

The controller 170 is configured so as to control the various constituent elements of the machine tool 200. The controller 170 can comprise, for example, a processor such as a CPU (Central Processing Unit), storage devices such as a hard disk drive, ROM (read-only memory), and RAM (random access memory), and elements such as input devices and output devices (for example, a mouse, keyboard, liquid crystal display and/or touch panel, etc.). These elements are connected to each other via busses (not illustrated). The controller 170 may further comprise other elements.

The controller 170 comprises the NC device 171 for controlling the feeding of the saddles 130, spindle head 140, and table 160, and the rotation of the spindle 150. Furthermore, in the present embodiment, the controller 170 comprises an A/E convener (Air Electronic converter) 172 for detecting increases in pressure in a channel 91 (not illustrated in FIG. 7; will be described in detail later). The A/E converter 172 is connected to the channel 91 by piping P through which fluid (For example, compressed air) flows. As the pressure in the channel 91 and the piping P connected thereto rises, the A/E converter 172 can indicate the pressure rise by an electrical signal. In place of the A/E converter, an air pressure sensor may be used.

Next, the tool holder 100 will be described in detail.

Comparing FIGS. 7 and 1, it can be understood that the tool holder 100 of FIG. 1 is rotated by 90° counter-clockwise from the posture shown in FIG. 7. With reference to FIG. 1, the tool holder 100 comprises an outside portion 10, a rotation input part 20, a speed change mechanism 30, a rotation output part 40, a conversion mechanism 50, a slider 60, and a cutting edge 70.

With reference to FIG. 7, the outside portion 10 is connected and affixed to the spindle head (spindle housing) 140. Specifically, the outside portion 10 has a body part 11 and a positioning part 12. The body part 11 has a substantially cylindrical shape, and houses the various constituent elements (for example, a part of the rotation input part 20, the speed change mechanism 30, the rotation output part 40 (not illustrated in FIG. 7), etc.) of the tool holder 100. The body part 11 is connected to the spindle 150 via the rotation input part 20.

The positioning part 12 is provided on the outer surface of the body part 11. The positioning part 12 is configured so as to be connected and affixed to a positioning block 141 provided on the spindle head 140. Thus, the outside portion 10 is affixed to the spindle head 140 by the positioning part 12, and does not rotate with respect to the spindle head 140.

The rotation input part 20 is gripped by the spindle 150. Specifically, with reference to FIG. 1, the rotation input part 20 has a substantially cylindrical shape, and one end thereof has a shank part 21 configured so as to be gripped by the spindle 150. The rotation input part 20 penetrates the body part 11 of the outside portion 10 from one end to the other along the rotational axis Os. The slider 60 is held at the other end of the rotation input part 20. The intermediate portion of the rotation input part 20 is housed inside the body part 11, and is supported by a bearing B1 so as to be rotatable on the body part 11. The rotation input part 20 is directly rotated by the spindle 150 gripping the shank portion 21. Specifically, the rotation input part 20 rotates at the first rotation speed r1 in the same manner as the spindle 150.

The speed change mechanism 30 is configured so as to change (for example, decelerate) the rotation from the rotation input part 20. For example, the speed change mechanism 30 comprises first to sixth gears 31 to 36. The first gear 31 is affixed to the rotation input part 20 and rotates along with the rotation input part 20. The second gear 32 is rotatably supported on the body part 11 of the outside portion 10, and meshes with the first gear 31. The third gear 33 is coaxial with the second gear 32 and is rotatably supported on the body part 11. The third gear 33 rotates along with the second gear 32. The fourth gear 34 is rotatably supported by the rotation input part 20 via a bearing B2, and meshes with the third gear 33. The fourth gear 34 has a ring-like shape, and has teeth on the inner peripheral surface thereof. Each of the plurality of fifth gears 35 is rotatably supported by the rotation input part 20 and is arranged inside the fourth gear 34 so as to mesh with the teeth inside the fourth gear 34. The sixth gear 36 is affixed to the rotation output part 40 and rotates along with the rotation output part 40. The sixth gear 36 meshes with the plurality of fifth gears 35. When the rotation input part 20 is rotated by the spindle 150, the first gear 31 on the rotation input part 20 rotates the second gear 32, and as a result, the third gear 33 rotates along with the second gear 32. The third gear 33 rotates the fourth gear 34, and as a result, the plurality of fifth gears 35 meshing with the teeth inside the fourth gear 34 also rotate. The fifth gears 35 rotate the sixth gear 36, and as a result, the rotation output part 40 rotates along with the sixth gear 36. Note that a person skilled in the art could appropriately set the specification of the first to sixth gears 31 to 36 depending on the desired gear ratio (for example, deceleration ratio). The speed change mechanism 30 may be configured so as to decelerate the rotation from the rotation input part 20 to, for example, approximately ⅟₁₀₀. The gear ratio may be another value. Furthermore, the configuration of the speed change mechanism 30 is not limited to the foregoing, and the speed change mechanism 30 may have another configuration.

As described above, the rotational power from the rotation input part 20 is transmitted to the rotation output part 40 via the speed change mechanism 30. The rotation output part 40 rotates at a second rotation speed r2 different from the first rotation speed r1 in accordance with the gear ratio of the speed change mechanism 30. The rotation output part 40 has a substantially columnar or cylindrical shape, and is rotatably provided in the inside of the rotation input part 20 via a bearing B3.

The rotation output part 40 comprises a clutch mechanism 41. The clutch mechanism 41 is configured so as to intercept the transmission of power from the rotation output part 40 to the conversion mechanism 50 when a body part 51 (which will be described in detail later) of the conversion mechanism 50 moves excessively to the right side or the left side in FIG. 1.

FIG. 6(a) is a schematic perspective view showing the clutch mechanism 41 in a meshed state, and FIG. 6(b) is a schematic perspective view showing the clutch mechanism 41 in a disengaged state. With reference to FIGS. 6(a) and (b), the clutch mechanism 41 comprises a plurality of disc springs 41a, a clutch component 41b, and a driven component 41c. With reference to FIG. 1, the clutch component 41b is affixed to a body part 42 of the rotation output part 40.

The driven component 41c is provided with a female threading 41f which engages with a male threading 51a provided on the body part 51 of the conversion mechanism 50.

Figure 6:
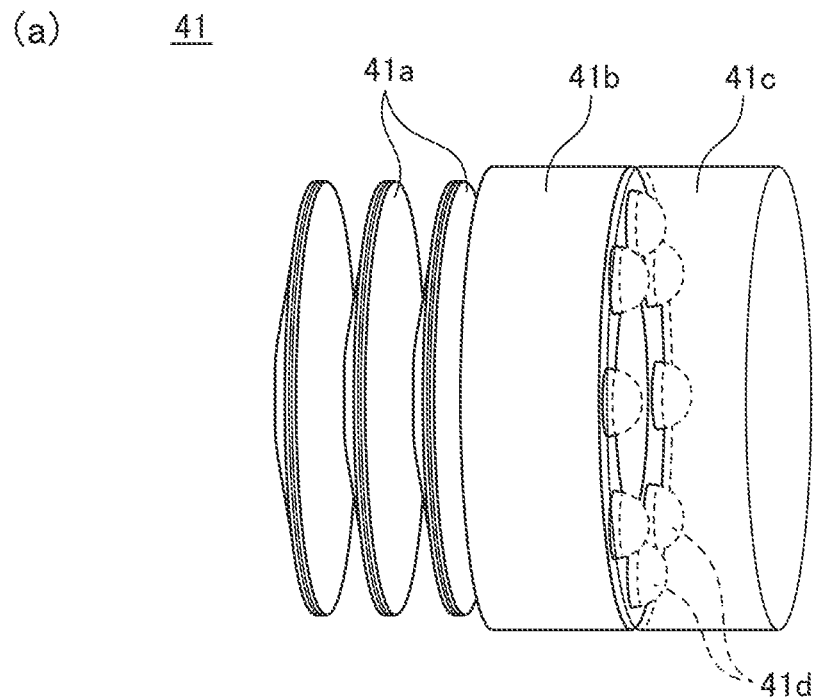
FIG. 6(a) is a schematic perspective view showing a clutch mechanism in a meshed state.
FIG. 6(b) is a schematic perspective view showing a clutch mechanism in a disengaged state.
Figure 6:
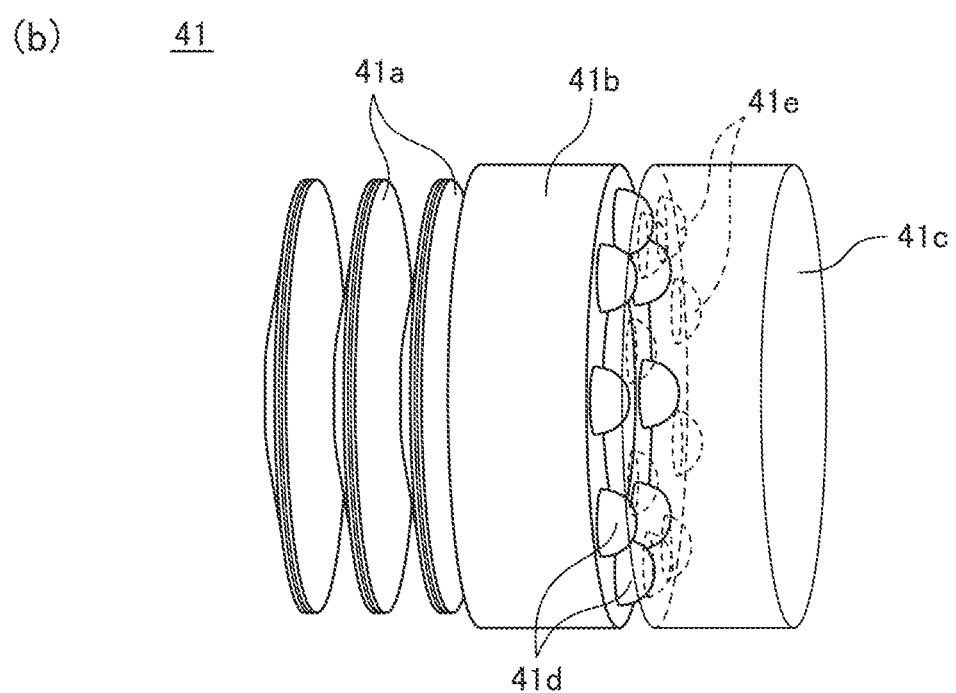

With reference to FIG. 6(b), a plurality of balls 41d are rotatably embedded in the clutch component 41b, and a plurality of recesses 41e capable of engaging with the balls 41d are provided in the driven component 41c. As shown in FIG. 6(a), the balls 41d normally engage with the recesses 41e. Thus, the rotational power from the body part 42 (not illustrated in FIG. 6) of the rotation output part 40 is transmitted to the driven component 41c via the clutch component 41b, the balls 41d, and the recesses 41e. With reference to FIG. 1, when the driven component 41c rotates, as a result of the engagement between the female threading 41f of the driven component 41c and the male threading 51a of the conversion mechanism 50, the conversion mechanism 50 moves linearly along the rotational axis Os. Due to the structure described above, the rotational movement of the rotation output part 40 is converted into a linear movement along the rotational axis Os.

When the body part 51 of the conversion mechanism 50 moves excessively to the right side or left side in FIG. 1, since the male threading 51a of the conversion mechanism 50 cannot move along the female threading 41f of the driven component 41c, the rotational torque exerted on the driven component 41c rises. As shown in FIG. 6(b), when the rotational torque exerted on the driven component 41c rises above a predetermined value, the balls 41d escape from the recesses 41e and push the clutch component 41b away from the driven component 41c. As a result, the disc springs 41a are deformed, and the clutch component 41b is separated from the driven component 41c. Due to the above configuration, the transmission of power from the rotation output part 40 to the conversion mechanism 50 is blocked, whereby damage to the components can be prevented.

With reference to FIG. 1, the conversion mechanism 50 converts the rotational movement input from the rotation output part 40 to linear movement in the radial direction (the first direction) intersecting (for example, perpendicular to) the rotational axis Os. Specifically, the conversion mechanism 50 comprises the body part 51 and a pivot part 52. As described above, the body part 51 has male threading 51a. The body part 51 is moved along the rotational axis Os by the rotational power from the rotation output part 40 due to the engagement between the male threading 51a and the female threading 41f of the driven component 41c. The body part 51 is provided with a first rack 51b, and the pivot part 52 is provided with a first pinion 52a which engages with the first rack 51b. When the body part 51 moves along the rotational axis Os, the pivot part 52 rotates due to the engagement between the first rack 51b and the first pinion 52a. The pivot part 52 comprises a second pinion 52b.

The slider 60 is configured so as to move radially by the power from the rotation output part 40 (i.e., the rotational power from the spindle 150) via the conversion mechanism 50. Specifically, the slider 60 has a rack 60a which engages with the second pinion 52b of the pivot part 52 of the conversion mechanism 50. When the pivot part 52 rotates, the slider 60 is moved in the radial direction due to the engagement between the second pinion 52b of the pivot part 52 and the rack 60a of the slider 60.

The slider 60 is configured so as to hold the cutting edge 70. The slider 60 is supported so as to be movable in the radial direction with respect to the rotation input part 20, while the slider 60 is affixed to the rotation input part 20 in the direction of rotation. Thus, slider 60 rotates together with rotation input part 20. Specifically, the slider 60 (and the cutting edge 70 held thereby) is rotated at the first rotation speed r1 in the same manner as the spindle 150 and the rotation input part 20.

Figure 3:
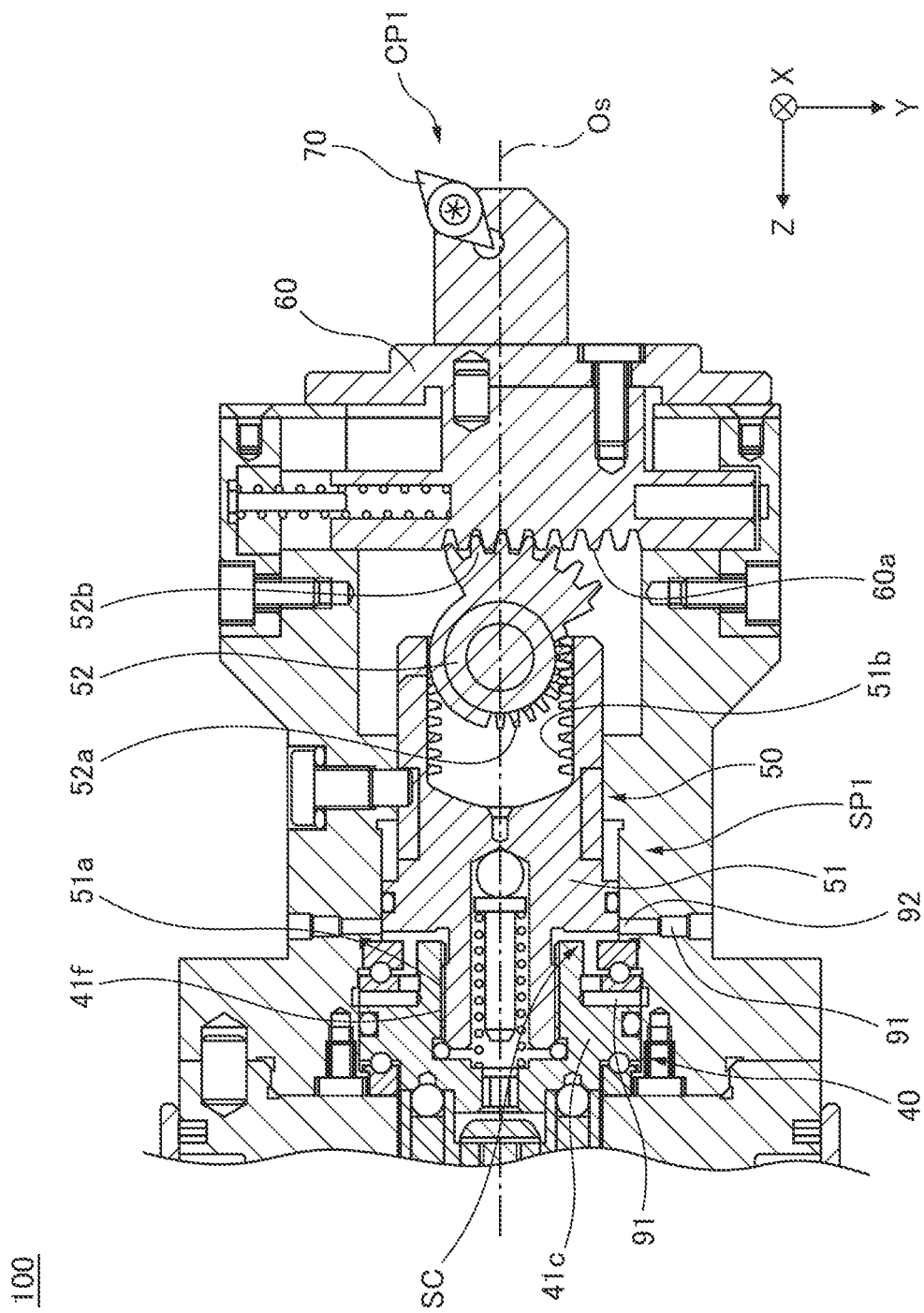
FIG. 3 is an enlarged cross-sectional view showing a cutting edge when in an origin position.
Figure 4:
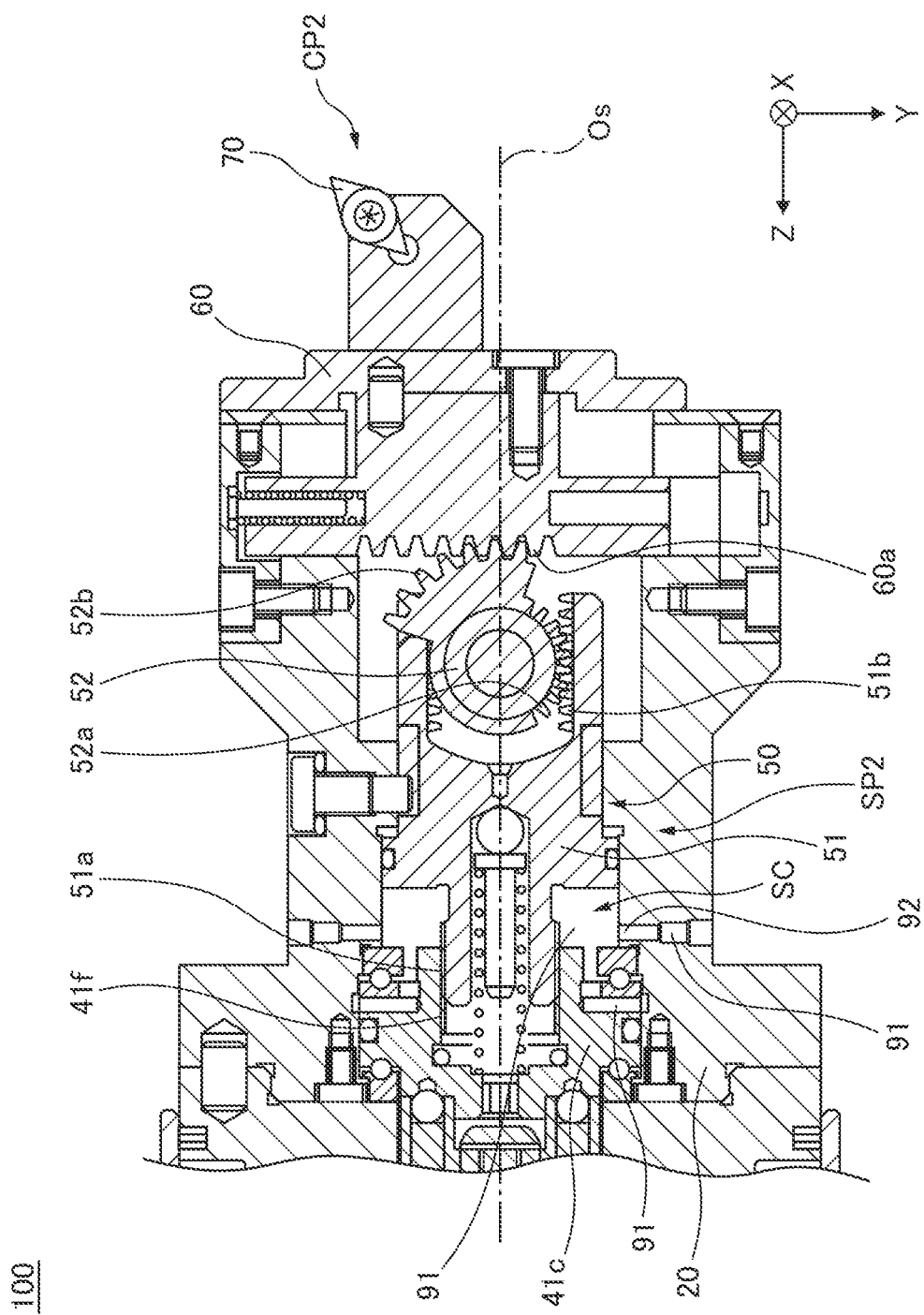
FIG. 4 is an enlarged cross-sectional view showing a cutting edge when in a maximum diameter position.

FIG. 3 is an enlarged cross-sectional view showing the cutting edge 70 when in the origin position CP1, and FIG. 4 is an enlarged cross-sectional view of the cutting edge 70 when in the maximum diameter position CP2. As shown in FIGS. 3 and 4, the cutting edge 70 can move linearly in the radial direction with respect to the rotational axis Os between the origin position CP1 (FIG. 3) closer to the rotational axis Os and the maximum diameter position CP2 (FIG. 4). Correspondingly, the body part 51 of the conversion mechanism 50 can move linearly along the rotational axis Os between the origin position SP1 (FIG. 3) closer to the rotation output part 40 and the terminal position (or intermediate position) SP2 (FIG. 4) spaced from the rotation output part 40.

Figure 2:
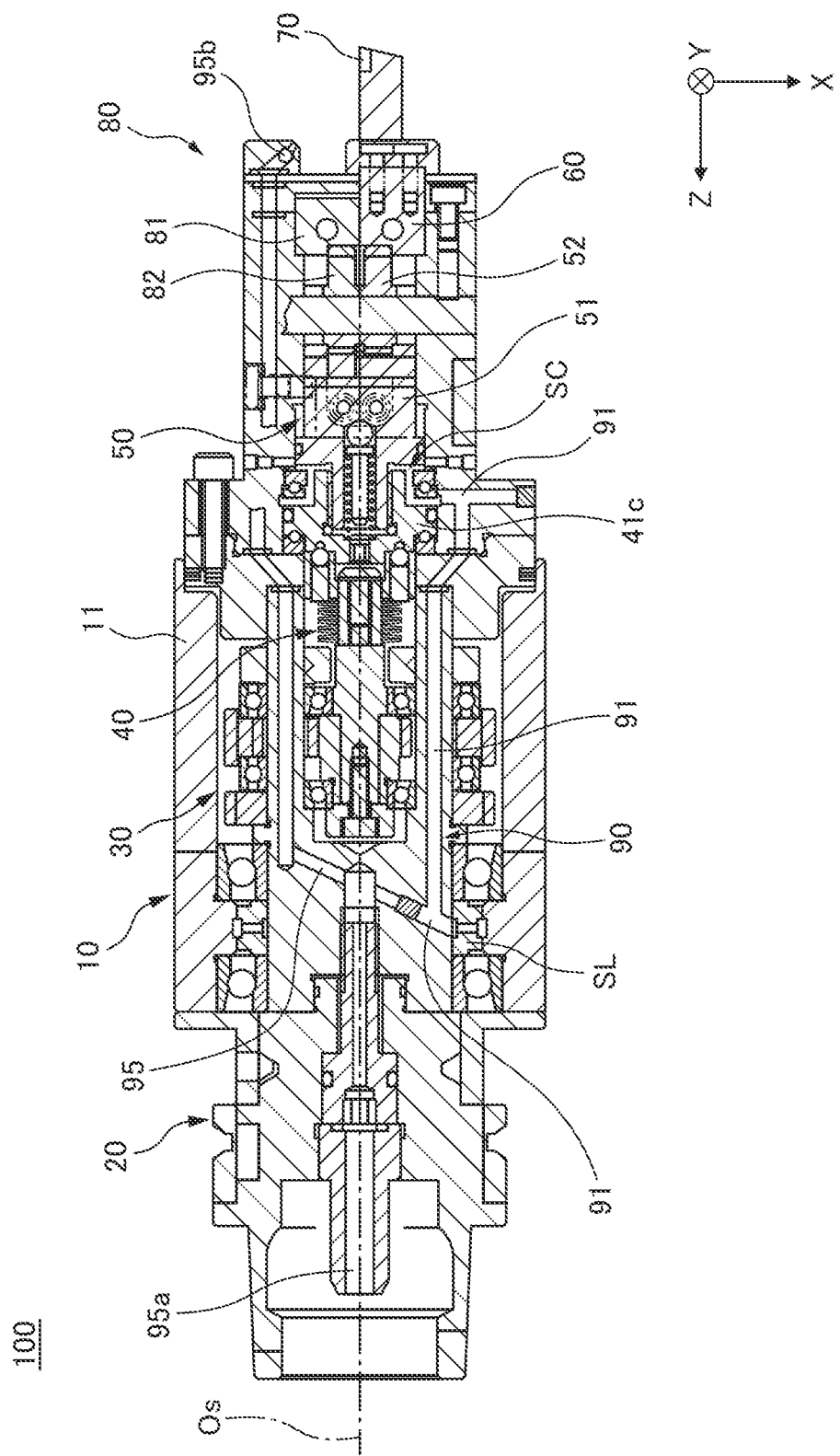
FIG. 2 is a schematic cross-sectional view taken along the rotational axis orthogonal to FIG. 1.
Figure 5:
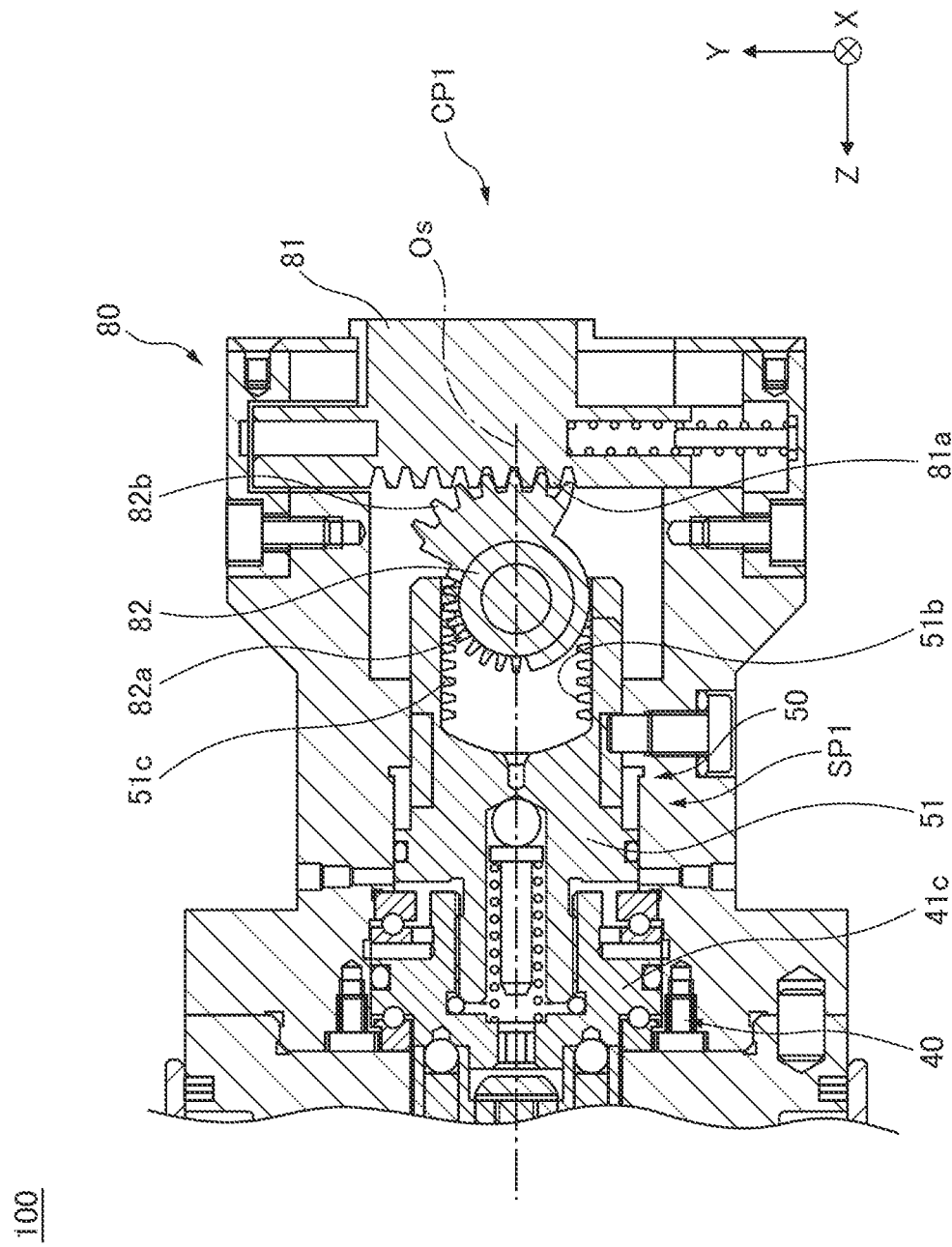
FIG. 5 is an enlarged cross-sectional view showing a counterweight as viewed in the direction opposite to that of FIG. 3.

FIG. 5 is an enlarged cross-sectional view showing a counterweight mechanism 80 viewed from the direction opposite FIG. 3. Comparing FIGS. 3 and 5, when the tool holder 100 is cut along the YZ plane, FIG. 3 shows a cross-section of one half of the cut tool holder (a cross-section when viewed in the positive direction in the X-direction) and FIG. 5 shows a cross-section of the other half of the cut tool holder (a cross-section when viewed in the negative direction in the X-direction). From FIGS. 3 and 5, it can be understood that the counterweight mechanism 80 and the slider 60 are arranged side by side with respect to a plane passing through the rotational axis Os (YZ plane in FIGS. 3 and 5). Thus, in FIG. 3, since the counterweight mechanism 80 is behind the slider 60, the counterweight mechanism 80 is not shown. Likewise, in FIG. 5, since the slider 60 is behind the counterweight mechanism 80, the slider 60 is not shown. This can also be understood from FIG. 2, which shows a cross-section rotated 90° around the rotational axis Os from FIG. 3 (and FIG. 5). As shown in FIG. 2, the counterweight mechanism 80 and the slider 60 are arranged side by side with respect to the YZ plane.

With reference to FIG. 3, when the slider 60 moves so as to be spaced from the origin position CP1, the center of gravity of the slider 60 moves so as to be spaced from the rotational axis Os. Thus, centrifugal force is exerted on the tool holder 100 due to the deviation of the center of gravity of the slider 60. Centrifugal force can adversely affect machining accuracy. Thus, with reference to FIG. 5, the tool holder 100 includes the counterweight mechanism 80 to offset the above centrifugal force. The counterweight mechanism 80 has a weight part 81 and a pivot part 82.

Specifically, the body part 51 of the conversion mechanism 50 has a second rack 51c on the side opposite the first rack 51b. The pivot part 82 has a first pinion 82a which engages with the second rack 51c, and is rotated by the body part 51 when the body part 51 moves along the rotational axis Os. Furthermore, the pivot part 82 has a second pinion 82b and the weight part 81 has a rack 81a which engages with the second pinion 82b. When the pivot part 82 rotates, the weight part 81 is moved linearly in the radial direction with respect to the rotational axis Os by the pivot part 82.

With reference to FIG. 3, when the body part 51 of the conversion mechanism 50 moves from the origin position SP1, the slider 60 is moved in the radial direction from the origin position CP1 by the pivot part 52. Simultaneously, with reference to FIG. 5, when the body part 51 moves from the origin position SP1, the weight part 81 is moved in the radial direction in the direction opposite the slider 60 by the pivot part 82. As a result of the above structure, the deviation of the center of gravity of the slider 60 (FIG. 3) is offset by the weight of the weight part 81 (FIG. 5).

With reference to FIG. 1, the tool holder 100 comprises a detection mechanism 90 for detecting that the cutting edge 70 is in the origin position CP1. Specifically, in the present embodiment, the detection mechanism 90 has a channel 91 for the passage of fluid. With reference to FIG. 7, the channel 91 (not illustrated in FIG. 7) is connected to the piping P via the positioning block 141. With reference to FIG. 1, the channel 91 penetrates from the positioning part 12 to a seal SL arranged between the outside portion 10 and the rotation input part 20.

FIG. 2 is a schematic cross-sectional view orthogonal to FIG. 1 along the rotational axis OS, and shows a cross-sectional view rotated by 90° about the rotational axis Os from FIG. 1. The channel 91 further penetrates the rotation input part 20 from seal SL and the extends parallel to the rotational axis Os. The channel 91 further passes through the space SC defined by the rotation input part 20, the driven component 41c, and the body part 51. With reference to FIG. 4, the channel 91 further passes through the rotation input part 20 from the space SC through an opening 92 provided in the rotation input part 20, leading to the outside of the rotation input part 20.

As shown in FIG. 3, the opening 92 is positioned so as to face the body part 51 of the conversion mechanism 50 when the conversion mechanism 50 is in the origin position SP1 (i.e., when the cutting edge 70 is in the origin position CP1). Thus, the channel 91 is fully or partially closed by the body part 51 when the conversion mechanism 50 is in the origin position SP1. Therefore, when the conversion mechanism 50 is in the origin position SP1, the pressure of the fluid in the channel 91 upstream of the opening 92 and the piping P connected thereto rises. Conversely, as shown in FIG. 4, the channel 91 is open when the conversion mechanism 50 is not in the origin position SP1.

With reference to FIG. 2, the tool holder 100 comprises a channel 95 for supplying coolant to the cutting edge 70. The channel 95 extends from an inlet 95a near one end of the rotation input part 20 to an injection port 95b at the other end. Coolant is supplied to the channel 95 from the inlet 95a and injected toward the cutting edge 70 from the injection port 95b.

Next, a workpiece machining method according to an embodiment will be described.

FIG. 8 is a flowchart showing the operation of the machine tool 200. For example, the operation can be facing of a workpiece. For example, the workpiece machining method starts when workpiece machining is instructed to the controller 170. The controller 170 moves the spindle 150 to a tool exchange position (which may also be referred to as spindle orientation) for installation of the tool holder 100 in the spindle 150 (step S100). Next, the tool installed in the spindle 150 is exchanged with the tool holder 100 (step S102). As a result, the tool holder 100 is installed in the spindle 150. Tool exchange may be carried out by, for example, an ATC (automatic tool changer; not illustrated), and the controller 170 may transmit commands to the ATC.

Next, the controller 170 switches the spindle 150 from the speed control mode to the Cs-axis mode (step S104). Next, the controller 170 detects whether or not the cutting edge 70 is in the origin position CP1 (step S106). For example, the controller 170 supplies compressed air to the channel 91 via the piping P, and can judge whether or not the pressure of the compressed air in the channel 91 is greater than a predetermined value based on an electrical signal of the A/E converter 172. When the pressure is greater than the predetermined value, the channel 91 is closed by the body part 51 of the conversion mechanism 50, and specifically, the conversion mechanism 50 is in the origin position SP1 (i.e., the cutting edge 70 is in the origin position CP1). When the pressure is equal to or less than the predetermined value, the channel 91 is open, and specifically, the conversion mechanism 50 is not in the origin position SP1 (i.e., the cutting edge 70 is not in the origin position CP1).

When it is detected in step S106 that the cutting edge 70 is in the origin position CP1, the controller 170 sets the rotation angle position of the spindle 150 at that time as the origin of the Cs-axis mode, thereby associating the position of the cutting edge 70 in the radial direction and the rotation angle position of the spindle 150 (step S108). When it is detected in step S106 that the cutting edge 70 is not in the origin position CP1, the controller 170 moves the cutting edge 70 to the origin position CP1 (step S110). Specifically, the controller 170 rotates the spindle 150 until the cutting edge 70 is moved to the origin position CP1 (i.e., until the pressure of the compressed air in the channel 91 is greater than the predetermined value). Next, the controller 170 executes step S108.

Next, the controller 170 moves the spindle 150 to the machining start position (which may also be referred to as spindle positioning) (step S112). Next, the controller 170 machines the workpiece while rotating the cutting edge 70 and moving the cutting edge 70 in the radial direction (step S114), and the series of operations ends. Specifically, the controller 170 rotates the spindle 150 by a predetermined rotation angle amount in order to machine the desired diameter. Since the rotation angle amount of the spindle 150 and the movement amount of the cutting edge 70 in the radial direction are associated based on the states of the constituent elements described above (for example, the female threading 41f of the rotation output part 40, the male threading 51a of the conversion mechanism 50, the first rack 51b, the first pinion 52a and second pinion 52b, as well as the rack 60a of the slider 60), the amount of radial movement of the cutting edge 70 for machining the desired diameter can be controlled based on the rotation angle amount of the spindle 150.

As described above, the tool holder 100 according to the embodiment comprises the slider 60 which moves the cutting edge 70 in the radial direction by the power from the rotation output part 40 (i.e., the rotational power from the spindle 150). In such a tool holder 100, the rotation angle amount of the spindle 150 and the movement amount of the cutting edge 70 in the radial direction can be associated in advance. Thus, after the tool holder 100 is installed in the spindle 150, by measuring the position of the cutting edge 70 in the radial direction, the rotation angle position of the spindle 150 and the position of the cutting edge 70 in the radial direction can be associated. Since the tool holder 100 according to the embodiment comprises the detection mechanism 90, which is capable of detecting that the cutting edge 70 is in the origin position CP1, when the cutting edge 70 is in the origin position CP1, the rotation angle position of the spindle 150 at that time can be set as the origin of the Cs-axis mode. Thus, the machine tool 200 can calculate the movement amount of the cutting edge 70 from the origin position CP1 in the radial direction during machining based on the relationship between the rotation angle amount of the spindle 150 and the movement amount of the cutting edge 70 in the radial direction associated in advance. Thus, excessive cutting can be prevented without a limiter, and a plurality of diameters can be machined by a single tool holder 100 without exchanging the tool holder 100. Therefore, facing can be performed in a short time.

Furthermore, in the tool holder 100, the detection mechanism 90 has the channel 91 through which fluid passes, and the channel 91 is configured so as to be closed when the cutting edge 70 is in the origin position CP1 and open when the cutting edge 70 is not in the origin position CP1. Thus, by passing fluid through the channel 91, a pressure rise of the fluid when the channel 91 is closed (i.e., when the cutting edge 70 is in the origin position CP1) can be detected by the A/E converter 172. Thus, detection can be performed using fluid (for example, compressed air), and the risk of damage to the constituent elements of the tool holder 100 can be reduced.

Furthermore, the tool holder 100 used in the method according to the embodiment comprises the slider 60, which moves the cutting edge 70 in the radial direction by the power from the rotation output part 40 (i.e., the rotational power from the spindle 150). By using such a tool holder 100 along with the machine tool 200, which comprises the Cs-axis, the rotation angle position of the spindle 150 and the position of the cutting edge 70 in the radial direction can be associated. This is enabled by step S106, in which the position of the cutting edge 70 in the radial direction is measured after installation of the tool holder 100 in the spindle 150. Thus, during machining the position of the cutting edge 70 in the radial direction can be calculated based on the relationship between the rotation angle amount of the spindle 150 and the movement amount of the cutting edge 70 in the radial direction, which are associated in advance. Thus, excessive cutting can be prevented without a limiter, and a plurality of dimeters can be machined by a single tool holder 100 without exchanging the tool holder. Therefore, facing can be performed in a short time.

Furthermore, in the method according to the embodiment, the tool holder 100 comprises the detection mechanism 90, which detects that the cutting edge 70 is in the origin position CP1, and step S106, in which the position of the cutting edge 70 in the radial direction is measured, includes detecting that the cutting edge 70 is in the origin position CP1 with the detection mechanism 90. Thus, it can be measured that the cutting edge 70 is in the origin position CP1, and the rotation angle position of the spindle 150 at that time can be set as the origin of the Cs-axis mode. Therefore, during machining, the movement amount of the cutting edge 70 from the origin position CP1 in the radial direction can be calculated.

Though the embodiments of the tool holder and machining method have been described, the present invention is not limited to the embodiments described above. A person skilled in the would understand that various changes can be made to the embodiments described above. Furthermore, a person skilled in the art would understand that the method described above need not be executed in the order described above, and can be executed in other orders as long as contradictions are not brought about thereby.

For example, in the embodiments described above, the detection mechanism 90 has the channel 91 for the passage of fluid. However, in another embodiment, the detection mechanism 90 may comprise, for example, an electrical sensor (for example, an eddy current sensor or the like) which is capable of detecting the body part 51 of the conversion mechanism 50, and such a sensor can transmit signals to the controller 170. Furthermore, in the embodiments described above, the cutting edge 70 being in the origin position CP1 is indirectly detected by detecting that the body part 51 of the conversion mechanism 50 is in the origin position SP1. However, in another embodiment, the detection mechanism 90 may comprise, for example, a sensor which directly detects the cutting edge 70 or slider 60.

Furthermore, in the method according to the embodiment described above, the tool holder 100 comprising the detection mechanism 90 is used. However, in the method according to another embodiment, the tool holder 100 may not comprise the detection mechanism 90, and the machine tool 200 may comprise a tool measuring device which is capable of measuring the position of the cutting edge. In this case, the method may further comprise a step of measuring the position of the cutting edge 70 with the tool measuring device prior to the step of machining the workpiece. In this case as well, the rotation angle position of the spindle 150 and the position of the cutting edge 70 in the radial direction can be associated, and during machining, the position of the cutting edge 70 in the radial direction can be calculated based on the rotation angle position of the spindle 150.

Furthermore, in the embodiments described above, the channel 91 is configured so as to be closed when the cutting edge 70 is in the origin position CP1 and open when the cutting edge 70 is not in the origin position CP1. However, in another embodiment, the channel 91 may be configured so as to be open when the cutting edge 70 is in the origin position CP1 and closed when the cutting edge 70 is not in the origin position CP1. This may be possible, for example, by changing the position of the channel 91 and the members through which the channel 91 passes.

In the present embodiment, since the diameter of the hole to be machined can be controlled by controlling the radial position of the cutting edge 70, errors can be corrected after the machining performed by the tool holder of the present invention. After performing first machining, the diameter of the machined hole is measured with a measurement device, whereby errors between the target diameter and the actually machined diameter are determined, which can be reflected in second and subsequent machining. This reduces errors and makes it possible to improve machining accuracy from second machining onward. Furthermore, by expanding the radial position of the cutting edge 70 in synchronization with the Z-axis while moving in the Z axis, tapered hole machining can be realized.

Further, in the present invention, boss-shaped machining is also easily possible. If the cutting edge 70 is positioned from the origin position outside the diameter of the boss shape, and the cutting edge is then moved in the direction opposite that of hole machining, it is possible to machine by contacting the cutting edge with the boss shape from the outside of the boss shape.

REFERENCE SIGNS LIST

10 Outside Portion
20 Rotation Input Part
40 Rotation Output Part
60 Slider
70 Cutting Edge
90 Detection Mechanism
91 Channel
100 Tool Holder
150 Spindle
200 Machine Tool
CP1 Cutting Edge Origin Position
Os Rotational Axis of Spindle

The invention claimed is:

1. A tool holder for use in a machine tool which is provided with a spindle in which the tool holder is installed, and a rotation angle position of the spindle is controllable, the tool holder comprising:
   an outside portion which is connected and affixed to a housing of the spindle,
   a first member having a shank which is gripped and rotated by the spindle at a first rotation speed,
   a second member rotatably supported inside the first member, wherein rotational power is transmitted from the first member, via a speed change mechanism, to the second member so that the second member rotates at a second rotation speed different from the first rotation speed, wherein the second member defines a threading,
   a conversion mechanism including a body part defining a first rack extending a predetermined length along a rotational axis of the spindle, and a threading which engages the threading of the second member, and a pivot part defining a first pinion which engages with the first rack and a second pinion, wherein the body part of the conversion mechanism is moved along the rotational axis of the spindle by the rotation of the second member through the engagement between the threading of the body part and the threading of the second member, and the pivot part is rotated by the movement of the body part of the conversion mechanism along the rotational axis of the spindle through the engagement between the first rack of the body part and the first pinion of the pivot part,
   a slider which is moved in a first direction intersecting the rotational axis of the spindle by power from the second member, wherein the slider defines a second rack which engages with the second pinion of the pivot part, the slider is moved in the first direction by the rotation of the pivot part through the engagement between the second pinion of the pivot part and the second rack of the slider, and
   a cutting edge which is moved in the first direction by the slider between an origin position and a maximum diameter position and which is rotated by the first member,
   wherein the second member comprises a clutch mechanism that is configured to prevent transmission of power from the second member to the conversion mechanism by intercepting rotation from the second member prior to transmission to the conversion mechanism,
   wherein the clutch mechanism comprises a driven component that defines the threading of the second member which engages with the threading of the body part of the conversion mechanism, and the transmission of power is intercepted as a result of rotational torque on the driven component exceeding a predetermined value.

2. The tool holder according to claim 1, further comprising;
   a channel through which fluid is capable of passing, and
   the channel is configured so as to be closed when the cutting edge is in the origin position and so as to be open when the cutting edge is not in the origin position, or alternatively, is configured so as to be open when the cutting edge is in the origin position and so as to be closed when the cutting edge is not in the origin position.

3. The tool holder according to claim 1, wherein the clutch mechanism comprises:
   a clutch component affixed to a body part of the second member,
   a plurality of balls rotatably embedded in the clutch component,
   a plurality of recesses capable of engaging with the balls provided in the driven component, and
   a disc spring for biasing the clutch component to the driven component.

* * * * *